(12) United States Patent
Beasley

(10) Patent No.: US 8,516,312 B2
(45) Date of Patent: Aug. 20, 2013

(54) BEHAVIOR-BASED INVENTION FOR PREDICTING AND AVOIDING NETWORK DOWNTIME

(76) Inventor: Peter Beasley, Dallas, TX (US)

( * ) Notice: Subject to any disclaimer, the term of this patent is extended or adjusted under 35 U.S.C. 154(b) by 634 days.

(21) Appl. No.: 12/661,364

(22) Filed: Mar. 16, 2010

(65) Prior Publication Data
US 2010/0241891 A1 Sep. 23, 2010

Related U.S. Application Data

(60) Provisional application No. 61/210,206, filed on Mar. 16, 2009.

(51) Int. Cl.
*G06F 11/00* (2006.01)

(52) U.S. Cl.
USPC .......................... 714/47.1; 707/694; 705/7.28

(58) Field of Classification Search
USPC .............. 714/47.1, 47.3; 707/694; 705/7.28
See application file for complete search history.

(56) References Cited

U.S. PATENT DOCUMENTS

| | | | | |
|---|---|---|---|---|
| 7,206,771 | B2 * | 4/2007 | Alvarez et al. | 706/45 |
| 7,653,516 | B2 * | 1/2010 | Babu et al. | 703/1 |
| 7,730,364 | B2 * | 6/2010 | Chang et al. | 714/47.2 |
| 7,778,856 | B2 * | 8/2010 | Reynolds et al. | 705/7.28 |
| 8,135,638 | B2 * | 3/2012 | Gopfert et al. | 705/35 |
| 2003/0046128 | A1 * | 3/2003 | Heinrich | 705/7 |
| 2008/0010522 | A1 * | 1/2008 | Uwatoko et al. | 714/23 |
| 2010/0042451 | A1 * | 2/2010 | Howell | 705/7 |
| 2010/0228579 | A1 * | 9/2010 | Holden | 705/7 |

* cited by examiner

*Primary Examiner* — Joseph Schell

(74) *Attorney, Agent, or Firm* — Steven Thrasher

(57) ABSTRACT

An invention to avoid the leading cause of IT and network downtime. The invention predicts the risk of failure of planned system changes and modifies the situation to avoid risks.

16 Claims, 12 Drawing Sheets

Example Prediction Model

Risk = a(Base Variable) + b(Temporal Variable) + c(Environmental Variable) + d(Organizational Variable) + e(Feedback).

| Effect Ratio of Model Components to Risk Prediction | | |
|---|---|---|
| Base Variable | About the person's past success / failure | 60% (a) |
| Temporal Variable | About this change situation | 10% (b) |
| Environmental Variable | About the interdependence of the asset | 10% (c) |
| Organizational Variable | How the organization affects the change | 5% (d) |
| Feedback | Correction based on past predictions & success ratings | 15% (e) |

Example Prediction Model

Risk = a(Base Variable) + b(Temporal Variable) + c(Environmental Variable) + d(Organizational Variable) + e(Feedback).

| Effect Ratio of Model Components to Risk Prediction | | |
|---|---|---|
| Base Variable | About the person's past success / failure | 60% (a) |
| Temporal Variable | About this change situation | 10% (b) |
| Environmental Variable | About the interdependence of the asset | 10% (c) |
| Organizational Variable | How the organization affects the change | 5% (d) |
| Feedback | Correction based on past predictions & success ratings | 15% (e) |

FIG. 2

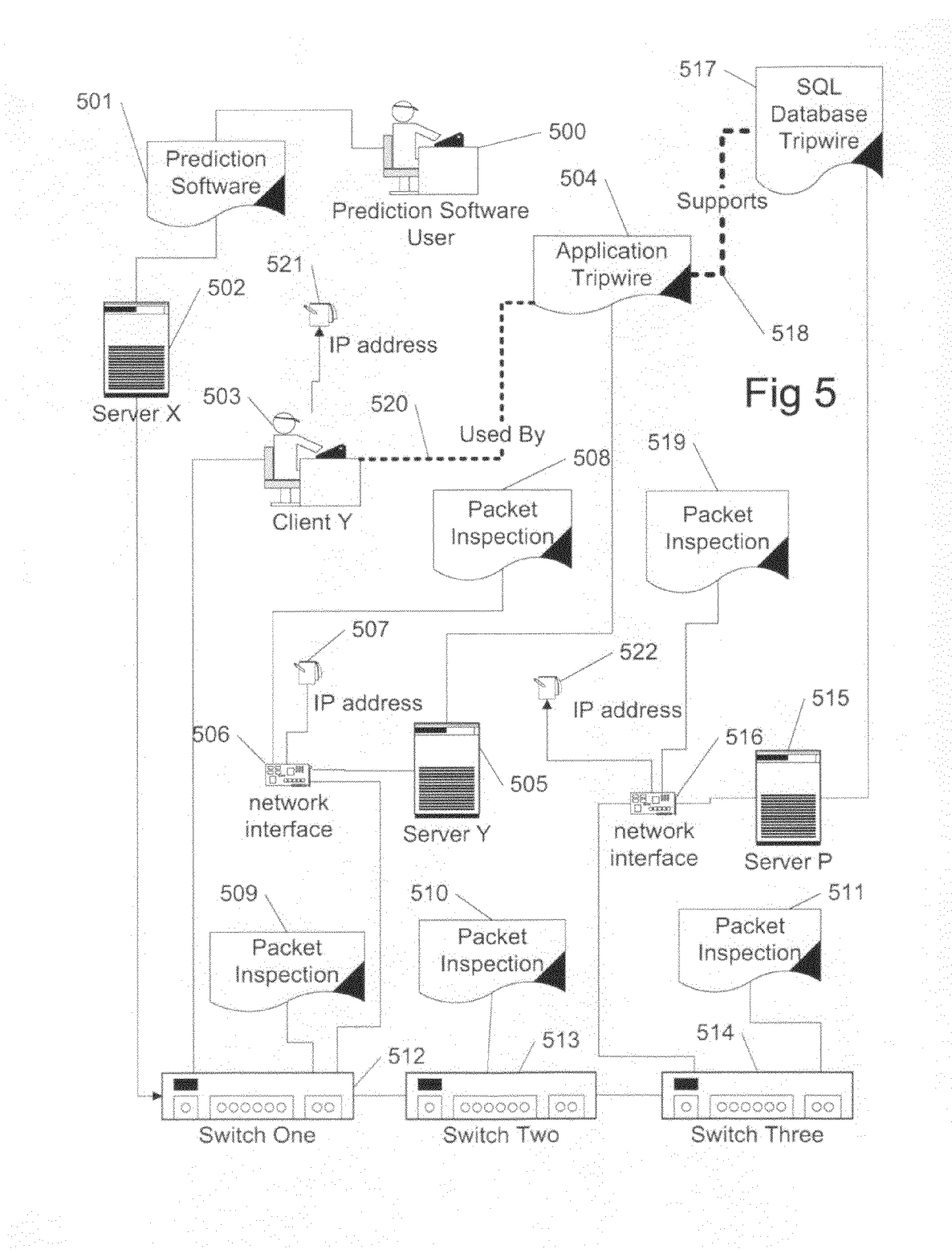

522

| Known TCP/IP Ports | | |
|---|---|---|
| Port | Description | Status |
| 1/TCP,UDP | TCP Port Service Multiplexer | Official |
| 2/TCP,UDP | Management Utility | Official |
| 3/TCP,UDP | Compression Process | Official |
| 5/TCP,UDP | Remote Job Entry | Official |
| 7/TCP,UDP | Echo | Official |
| 9/TCP,UDP | Discard | Official |
| 11/TCP,UDP | Active Users | Official |
| 13/TCP,UDP | DAYTIME - (RFC 867) | Official |
| 17/TCP,UDP | Quote of the Day | Official |
| 18/TCP,UDP | Message Send Protocol | Official |
| 19/TCP,UDP | Character Generator | Official |
| 20/TCP | FTP - data | Official |
| 21/TCP | FTP—control (command) | Official |
| | | |
| 1024/TCP,UDP | Reserved[1] | Official |
| | | |
| 1169/TCP,UDP | Tripwire | Official |
| | | |
| 1433/TCP | Microsoft SQL Server database management system Server | Official |

Fig 5 (continued)

BEHAVIOR-BASED INVENTION FOR PREDICTING AND AVOIDING NETWORK DOWNTIME

CROSS-REFERENCE TO RELATED APPLICATIONS

This application is related to, and claims priority from U.S. Provisional Patent Application 61/210,206 entitled Method and Apparatus to Identify and Eliminate the Leading Cause of Network Downtime, to Beasley, filed Mar. 16, 2009.

TECHNICAL FIELD OF THE INVENTION

The present invention relates generally to computer and telecommunications networks and, in particular, to methods and apparati for predicting the risk of failure associated with making infrastructure changes and their resulting unexpected consequences of these changes.

PROBLEM STATEMENT

Interpretation Considerations

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Problem Statement is to be construed as prior art.

Discussion

Computer and/or telecommunications networks include a plurality of personal computers, workstations, storage servers, database servers, applications, databases, network-attached devices, routers, firewalls, network interfaces and other devices, logical components like IP addresses, DNS addresses, and firewall rules, all interconnected by wired, wireless or hierarchical interconnection networks. The phrase "IT change management" refers to the management of planned changes to any of these components, in enterprise data networks or telecommunications networks. Within this description, the words "IT downtime" refer to loss or degraded performance to both enterprise data networks and telecommunications networks.

Poor changes to IT systems often result in a loss of performance or downtime. Indeed most IT downtime is caused by changes made to the IT systems by people. Accordingly, models are needed to better predict and identify these unexpected consequences such that they can be avoided, before they happen. The present invention provides such models.

BRIEF DESCRIPTION OF THE DRAWINGS

Various aspects of the invention, as well as an embodiment, are better understood by reference to the following detailed description. To better understand the invention, the detailed description should be read in conjunction with the drawings in which:

FIG. 2 is a flow diagram illustrating a method for prediction algorithm modeled in software according to the invention;

FIG. 5 is a diagram illustrating how application dependency mapping can be performed automatically from network traffic packet processing.

EXEMPLARY EMBODIMENT OF A BEST MODE

Interpretation Considerations

Figure 1:
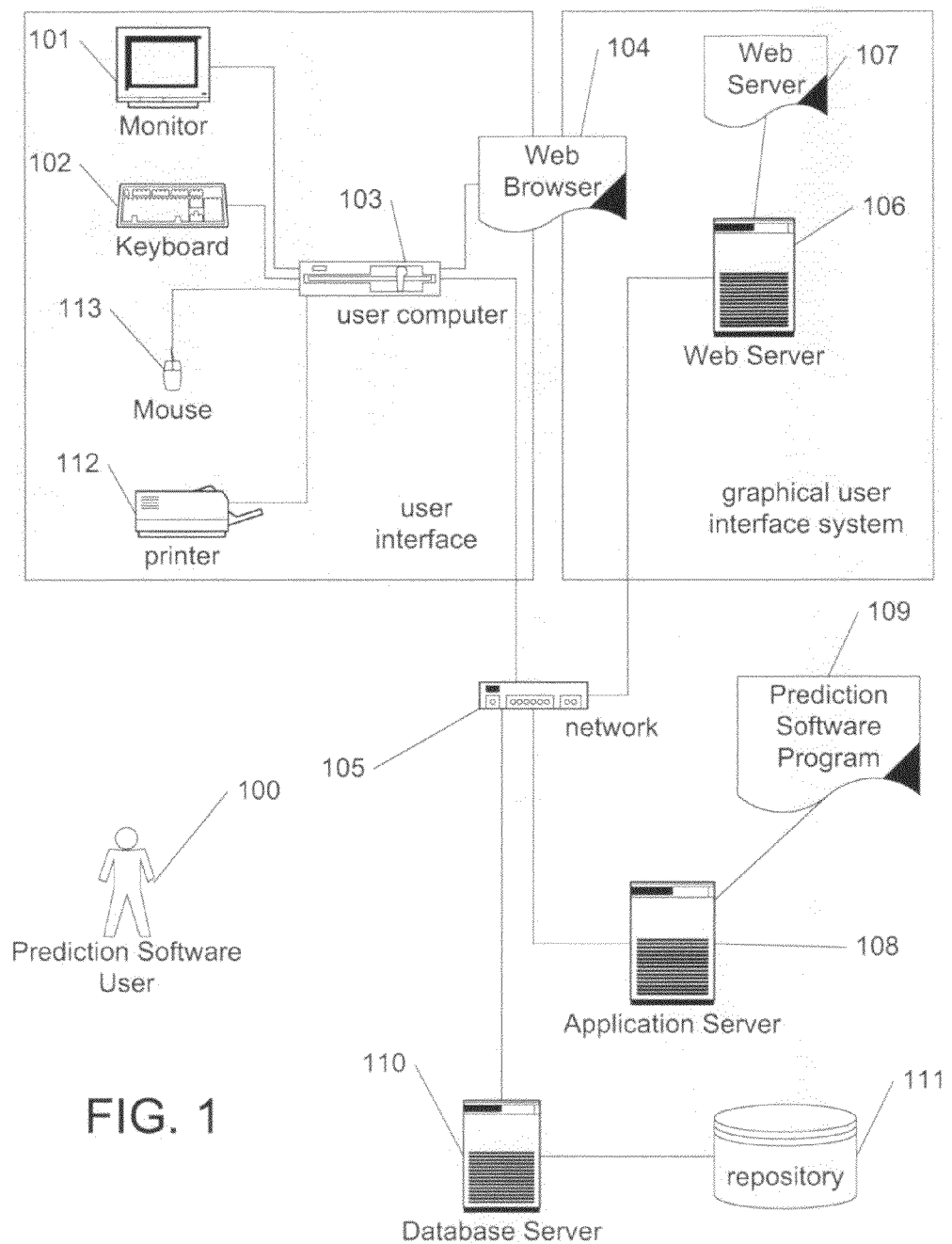
FIG. 1 is a diagram illustrating a computer system apparatus according to an illustrative embodiment thereof.

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching").

Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for -functioning-" or "step for -functioning-" in the Claims section. Sixth, the invention is also described in view of the Festo decisions, and, in that regard, the claims and the invention incorporate equivalents known, foreseeable, and unforeseeable. Seventh, the language and each word used in the invention should be given the ordinary interpretation of the language and the word, unless indicated otherwise.

Some methods of the invention may be practiced by placing the invention on a computer-readable medium. Computer-readable mediums include passive data storage, such as a random access memory (RAM) as well as semi-permanent data storage such as a compact disk read only memory (CD-ROM). In addition, the invention may be embodied in the RAM of a computer and effectively transform a standard computer into a new specific computing machine.

Data elements are organizations of data. One data element could be a simple electric signal placed on a data cable. One common and more sophisticated data element is called a packet. Other data elements could include packets with additional headers/footers/flags. Data signals comprise data, and are carried across transmission mediums and store and transport various data structures, and, thus, may be used to transport the invention. It should be noted in the following discussion that acts with like names are performed in like manners, unless otherwise stated.

Of course, the foregoing discussions and definitions are provided for clarification purposes and are not limiting. Unless otherwise indicated, acronyms used have the ordinary meaning of those acronyms in the context presented, and are readily understood by those of ordinary skill in the art. Words and phrases are to be given their ordinary plain meaning unless indicated otherwise.

Invention Overview

The invention teaches systems and methods for identifying and eliminating unexpected consequences of telecom and network change by predicting and/or identifying 1) risk of failure of a planned IT change, 2) likelihood of success of a planned IT change, 3) people that can be affected by an IT change, 4) systems that can be affected by an IT change, and 4) the otherwise unanticipated consequences of an IT change. This prediction is performed based on, in part, the present and past behavior of the change implementer, the behavior of the organization, and/or the interdependence of the item being changed, as corrected by past predictions and past change successes. The problems stated above, as well as other related problems of the prior art, are solved by the present invention, a method and apparatus for 1) predicting the risk of failure of an IT change, 2) the likelihood of success of an IT change, and 3) identification of the unexpected consequences of that change.

Failure of an IT change is described in its broadest sense in this invention. This definition encompasses failure types where a computer resource, data, or an information service is rendered inoperable, unavailable or degraded as a result of the change. Failures of an IT change can also occur when everything seems to go correct, but due to the lack of notification to the affected system end-users, people are inconvenienced unexpectedly. Latent failures occur too when a planned change is not completed by updating associated documentation, and at some time later, another failure occurs which in the final analysis, was a failure of a prior change to update necessary documentation.

The present invention relates to enterprise change management within a computer system network, where IT professionals follow a standard process to request, approve, complete, and rate IT changes. However, the invention is not a description of how to modify the behavior of people. The invention is a computer system and its associated business processes that computes risks and predicts, through computer modeling, the unanticipated consequences of change.

To perform these tasks, the software contains 7 components: 1) change process templates with ratings, 2) network configuration maps, 3) heuristics on past individual behavior, 4) a prediction model, 5) prediction algorithms, and optionally 6) heuristics on organizational behavior, or 7) situational feedback loops. This invention details templates, maps, individual heuristics, organizational heuristics, prediction models, and a business process on how to develop the prediction algorithm.

One might naturally make the false assumption that the risk of humans failing at making an IT change is too unpredictable. To explain away this tendency, a brief discussion on socio-technical systems theory and human error in collaborative systems is required.

Socio-technical systems (STS) theory was developed in the 1960's by Eric Trist and Fred Emery at the Tavistock Institute. STS points out that every organization is made up of people (the social system) using tools, techniques and knowledge (the technical system) to produce goods and services valued by customers (who are part of the organization's external environment). IT departments within organizations represent a social system that supports technical systems used by end-users. Socio-technical system concepts emphasize the two-way relationship between people and machines.

Performance in socio-technical systems is a function of many different causes, the people and the systems—some clear, and some obscured by symptoms of resulted outcomes. However, there is no doubt that STS provides significant clarity in understanding what drives performance in the organization and the complex dynamic between people and technology and with the right statistical data, you can make assertions about the expected performance.

Research on human error in collaborative systems concerns how human error affects systems and how these errors can be analyzed. Various researchers have classified human error in many ways.

When viewed at the cognitive level, there are three main types of errors; slips, lapses and mistakes.

Another error taxonomy was produced based on observable behavior; action in the wrong place, action at the wrong time, action of the wrong type, or action not included in the plan.

A skills-rule-knowledge taxonomy classifies the fundamental differences that appear in human error. This approach assumes that human error occurs at one of three distinct performance levels.

Skill-based performance: slips, double-capture slips, lapses, omissions following interruptions, reduced intentionality, perceptual confusions, interference errors, omissions, repetitions, reversals.

Rule-based performance: countersigns and nonsigns, information overload, rule strength, general rules, redundancy, rigidity, encoding deficiencies, action deficiencies, wrong rules, inelegant rules, inadvisable rules.

Knowledge-based performance: workspace limitations, out of sight out of mind, confirmation bias, over confidence, biased reviewing, illusory correlation, halo effect, problems with causality, problems with complexity, problems with delayed feedback, insufficient consideration of processes in time, difficulties with exponential developments, thinking in causal series not causal nets, thematic vagabonding and encysting.

When factoring in the effects of humans in groups, other types of human error appears: collusion, violation, defense, loss of control, buck passing, diffusion of responsibility, complacency.

Lastly, error in organizations include incompatible goals, organizational deficiencies, poor communications, design failures, poor defenses, poor training, poor procedures, poor housekeeping, poor maintenance management.

Defining a Base Variable

What is easily observed is that human error is complex. Some of the contributors to error are latent, lying in wait for other triggering or potentiating factors. Human performance involves a distributed system of interacting people and organizational elements. The context in which incidents evolve plays a major role in human performance. Plus, the way technology is deployed shapes human performance, creating the potential for new types of error and failure. In summary, so many factors abound such that it is impossible to tell if an error is a lack of expertise, a lack of knowledge, or some other form of failure.

Keep in mind though that humans have infinite attributes and capabilities to infer, anticipate, collaborate, redo, undo, communicate, plan, assume, perceive, role-play and otherwise solve problems before or immediately after they occur. Problem-solving and communications skills vary from individual to individual, such that a person's ability to anticipate or otherwise avoid problems is a personal characteristic of the individual. Some people are simply better than others at technology implementations, managing complex problems, and delivering effective communications.

This invention assumes that a personal characteristic exists that represents an individual's natural or innate capability at implementing IT changes and, as such, can eliminate the complexity around human performance by defining a Base Variable, computed in software from past successes or failures of IT changes. As in many situations, generally, future performance by people is often related to their past successes and failures. This invention uses software to record a success percentage, i.e. 100%, 90%, etc., for each change completed by an individual. This Base Variable is used as the base propensity for the individual to fail, or conversely, to succeed on IT change tasks in general, or in IT change tasks under specific conditions.

Accordingly, this invention computes and summarizes the risk or likelihood of human error into a single variable, thus eliminating any perceived inability in this invention to quantify human characteristics. As such, this invention applies also in cases where the change was not due to human sources; i.e. from a system hardware failure, a computer-generated change, or a natural disaster. This invention can predict the risk and outcomes for changes that were not caused by humans.

The Base Variable can be:
as simple as the average of the individual past success percentages for a person over a specified time period, or
success percentages that represent past success percentages for given task situations, or
computed based on personality factors of the individual (i.e. age, gender, extroversion, introversion, ability to handle stress), or
other methods easily contemplated to characterize a person's risk of failure into a single or ordered array of variables.

Prediction Model

Each prediction computation is performed in software based on a model. Various models can be used for the prediction.

Model One

Risk=a(Base Variable)+b(Temporal Variable)+c(Environmental Variable), where:
Temporal Variable is one that relates to the 1) task situation, 2) behavior of the person on this task, or 3) combinations of these or other factors.
Environmental Variable is one that relates to the system interdependency of the task. This metric can be computed by various methods, including 1) the number of subordinate systems that can be affected by the change, 2) the number of people or clients that can be affected by the change, 3) a cost impact that could be affected by the change, or 4) combinations of these or other factors.
Coefficients a, b and c are fixed, positive multipliers that assign a varying contribution of the variables into the overall risk computation.
In this model, task risk is assumed to be the standard risk for that particular individual (Base Variable) plus additive risks associated with the task situation or the environment in which the change is being performed.

$$\text{Risk} = a(\text{Base Variable}) + b(\text{Temporal Variable}) + c(\text{Environmental Variable}) + d(\text{Organizational Variable}),$$ Model Two where:
Organizational Variable is one that relates to characteristics of the organization that aids or detracts in the risk of failure.
Coefficients a, b, c and d are fixed, positive multipliers that assign a varying contribution of the variables into the overall risk computation.
In this model, task risk is also affected by additive risks associated with interaction within the organization.

$$\text{Risk} = a(\text{Base Variable}) + b(\text{Temporal Variable}) + c(\text{Environmental Variable}) + d(\text{Organizational Variable}) + e(\text{Feedback}),$$ Model Three where:
Feedback is an amount that is added or subtracted from the risk as a correction, based on past prediction/outcome results. Feedback can be computed by comparing past risk predictions to their eventual measure of success. That is, a change that was computed with a certain risk of failure, i.e. 22% risk, will ultimately be performed and in this invention, measured and ascribed a success metric, i.e. 100%, 90%, etc. A mathematical correlation can be computed in software that averages or relates predicted risks with past success metrics such that a correction factor can be computed and assigned to each individual that has past prediction and success outcome measures.

Coefficient e is a fixed, positive multipliers that assigns a varying contribution of the feedback into the overall risk computation.

In this model, the resulting risk computation is modified based on feedback from past change predictions and success ratings.

Model Four

Coefficients a, b, c, d and e are computed, positive or negative multipliers that assign a varying contribution of the variables into the overall risk computation.

Other models can be contemplated in other embodiments of the invention.

The invention computes the risk of failure for an individual performing a planned IT change. Additionally, the invention computes the likelihood of success for an individual performing a planned IT change. This computation is the corollary to risk of failure, where Likelihood for Success=100%–Risk of Failure. The invention also computes and predicts a risk percentage at which other systems may be affected by the IT change. That is, the prediction identifies other systems which may be affected by the change, and computes a risk. The computation also defines the relationship by which the IT change and the other systems are related. Further, there is provided a computation and prediction of a risk percentage at which people may be affected by the IT change. That is, the prediction identifies the people which may be affected by the change, and computes a risk. The computation also defines the relationship by which the IT change and the people are related.

There is provided a computation and prediction of a risk percentage at which documents may be affected by the IT change. That is, the prediction identifies the documents which may be affected by the change, and computes a risk. The computation also defines the relationship by which the IT change and the documents are related. The risk predictions and computations identify otherwise unexpected consequences of the IT change. This invention has the ability to uncover relationships between changes, systems and people in a fashion that cannot be accomplished easily without computer processing capabilities. As such, this invention identifies consequences of change that would otherwise be unexpected by IT professionals or people making such changes.

Description of the Drawings

FIG. 1 is a diagram of a computer system that implements the invention for a prediction software user 100. Shown are a monitor 101, a keyboard 102, mouse 113, user computer 103, GUI 104, network hardware 105, web server 106, web server software 107, an application server 108, prediction software 109, database server 110, a database repository 111, and a printer 112. Of course, because some of the constituent system components depicted in the accompanying Figures may be implemented in software, the actual connections between the system components may differ depending upon the manner in which the present invention is programmed.

FIG. 2 depicts an exemplary prediction model 200. With this model 200, a software implementation has a defined range of risk variables for each section of the model, as they contribute to added risk of the change 201. The actual percentages may vary, and can be first defined by 1) expert assumption, 2) industry research, 3) surveys of IT professionals, 4) experimentation or 5) detailed analysis of each change failure within a particular network environment.

Computing the Base Variable

Figure 3:
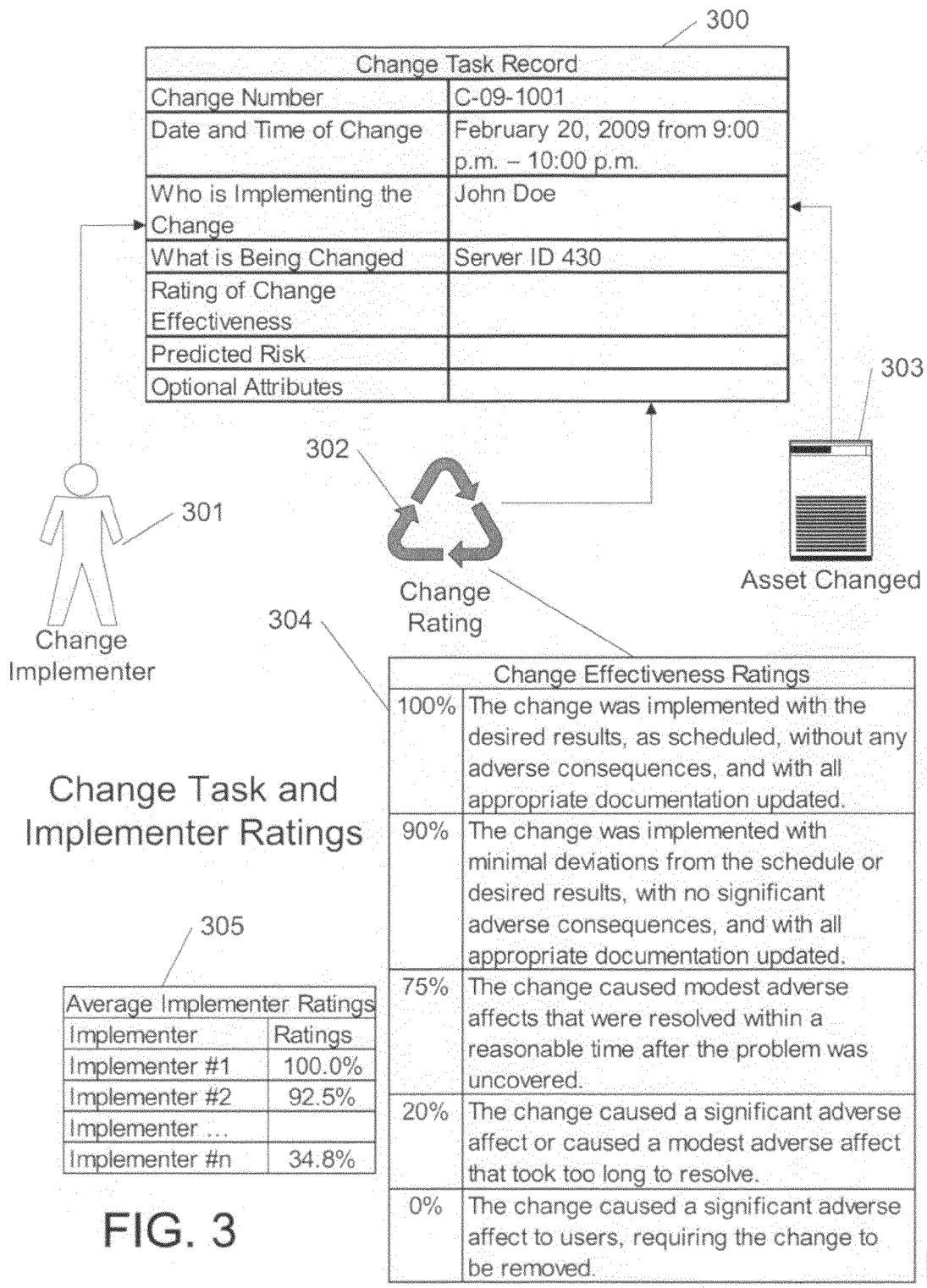
FIG. 3 is a flow diagram illustrating a method for defining a change record with ratings and summary ratings by change implementer.

This invention relies on Change Tasks records 300, as shown in FIG. 3. The components of these records include 1) a descriptor of the person making the system change 301, 2) a rating of how this change was completed 302, 3) a descriptor of the asset being changed 303, 4) a field that saves the computed prediction value, and 5) an ID number for the change record.

Depending on how this invention is implemented, a rating can be described in many ways, or as defined 304. If the rating is performed by several individuals, (such as the supervisors of each change implementers), wide gaps between the specific rating numbers (for example, 90% to 75%) are recommended instead of having many narrowly defined ratings (for example, 90%, 88%, 86%) to eliminate as much rating subjectivity between people performing the ratings.

Change records 300 preferably record other optional attributes, such as: date of the change, steps to be taken during the change, identification of who will be notified of the change, what testing has been done on the change, which customers will be affected by the change, what systems will be affected by the change, and how to recover from the change if it fails. The change implementer 301 saves the change record 300 in the repository 111 using the end-user computer 103 before the change is implemented.

After the change is completed, the rating 302 is added. Past change task records can be analyzed to compute a Base Variable for each individual change implementer as shown in table 305. The ratings can be described as a Likelihood Of Success rating, or as an inverse number, the Risk of Failure. As stated earlier, the Base Variable can be as simple as the average of past success ratings for an individual over a defined time period.

Computing the Temporal Variable

A temporal variable concerns the situation associated with the task and can be computed from analyzing upcoming change task records 300 saved in the repository 111. For example, more changes on the same day for the implementer or the organization increases the risk of failure. More changes on the same day of the same asset increases risk.

Analysis can include past change records 300 saved in the repository 111. For example, an average number of past changes per day can be determined, and more changes on an upcoming day than normal increases risk. The analysis could be more detailed, determining the average number of changes per day of the week (for example, Wednesday vs. Saturday), and depending of the date of the upcoming change, determine if there are more changes than normal for that day. Optional attributes 300 of the change can also be used to compute the temporal variable. For example, if the implementer takes the time to plan the steps of the change, there is a greater chance of success, or conversely, if not planned, has a higher risk of failure. If the implementer does not warn anyone about the change, the change can have a higher risk. The change implementer 300 can record in the prediction software 109, using simple flag check-boxes, whether what steps were taken in this particular change that aid or hinder change success. For example, one of ordinary skill in the related art will be able to contemplate various methods to analyze the change task records to gauge its relative risk as compared to other records in the database 111.

Computing the Environmental Variable

FIGS. 4 a-e, identify 1) who can be affected by the change, and 2) what can be affected by the change, and are referred to simultaneously. FIGS. 4a-c incorporate content of U.S. patent application Ser. No. 10/713,369, entitled "System, method and apparatus to manage infrastructure asset information," filed Nov. 14, 2003.

Figure 4A:
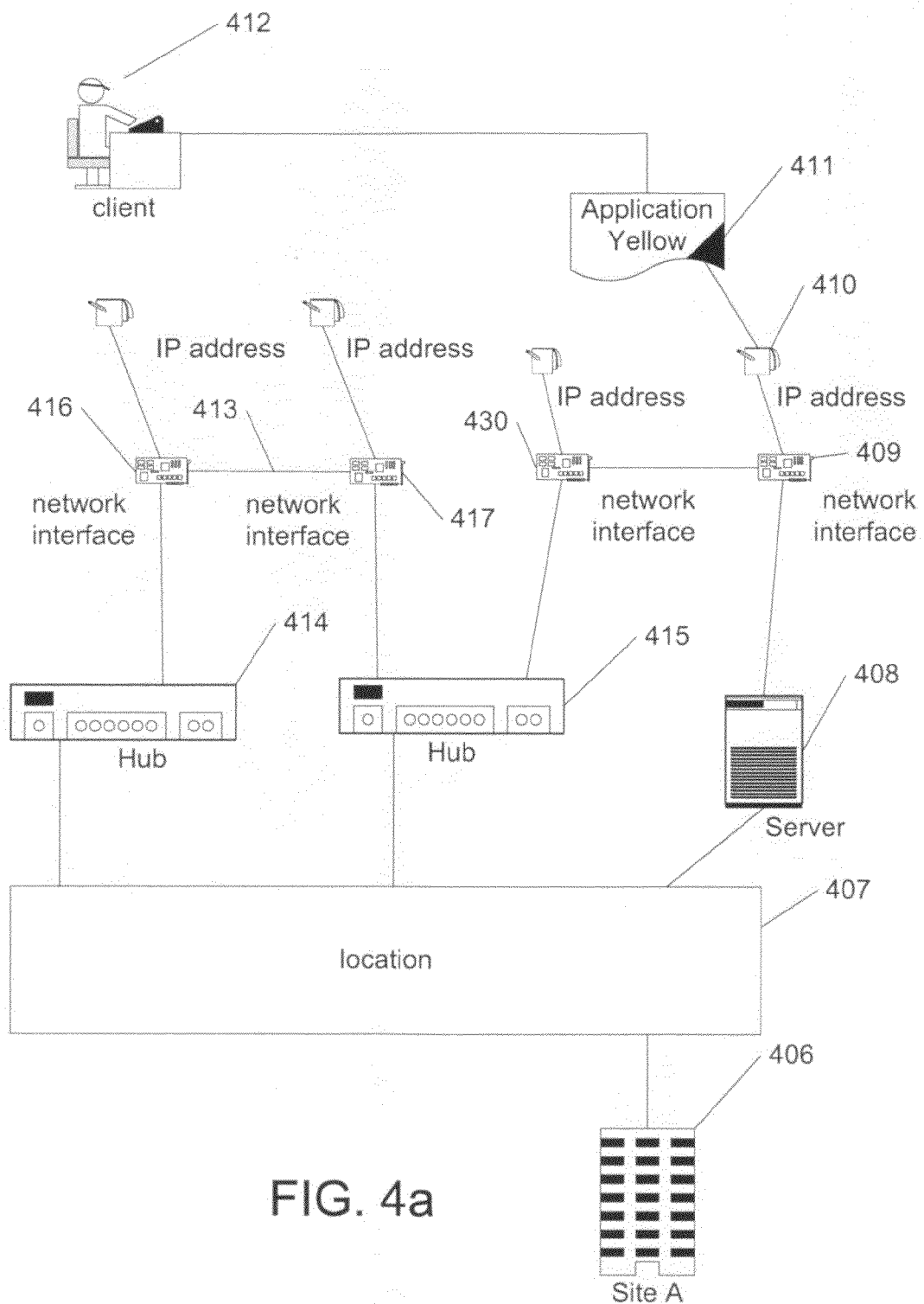
FIG. 4a is a diagram illustrating how configuration items are described and arranged in a software repository.
Figure 4B:
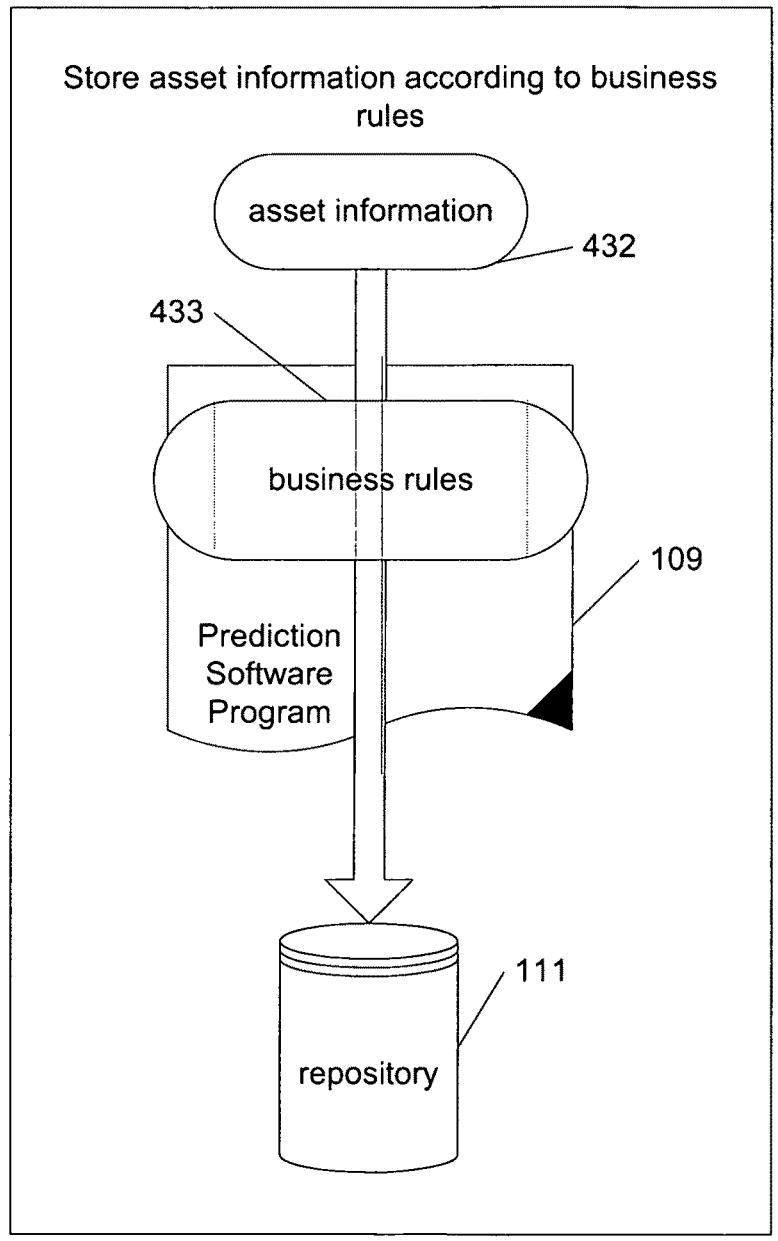
FIG. 4b is a flow diagram illustrating a method how configuration asset information items are saved by the prediction software into a repository.
Figure 4C:
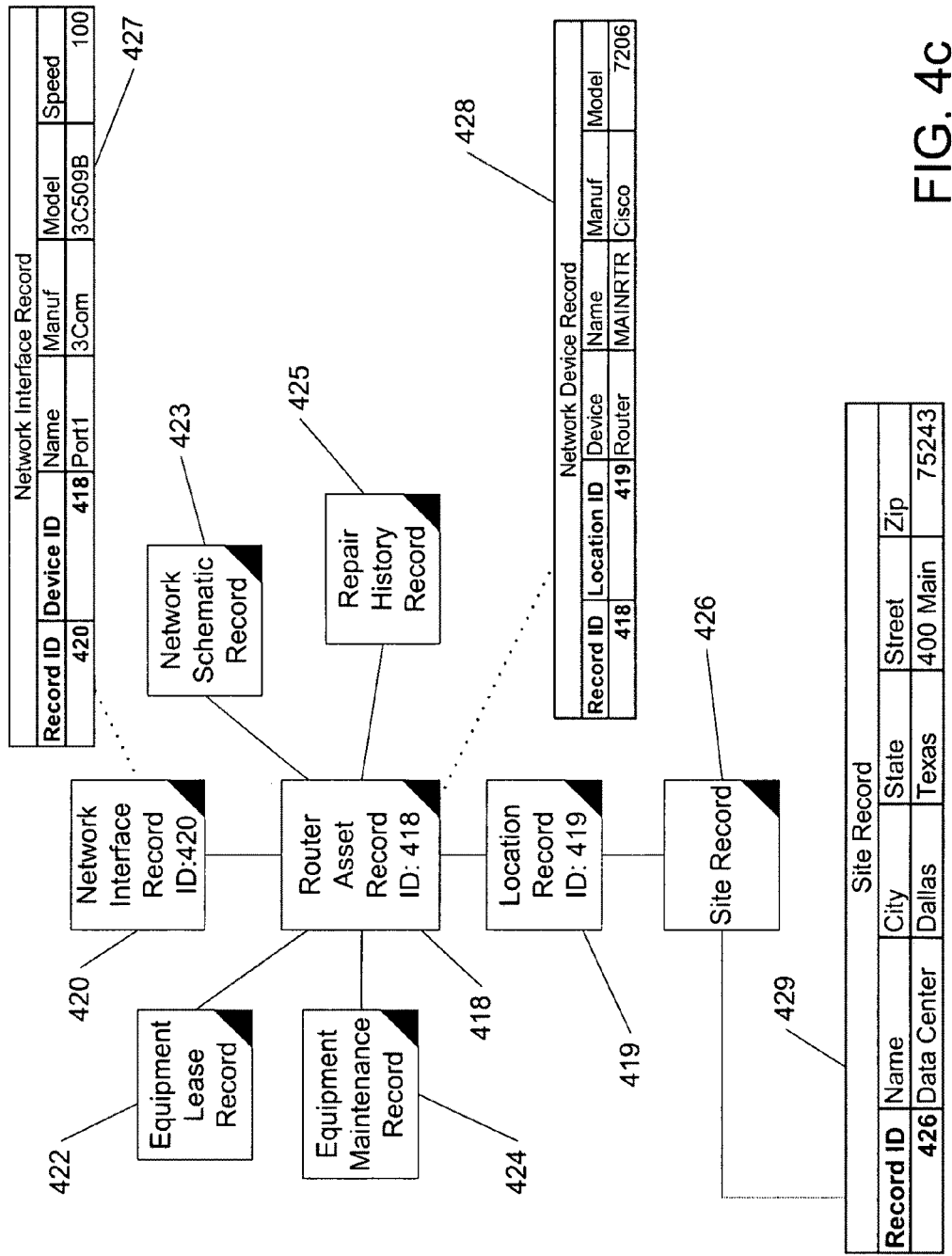
FIG. 4c is a flow diagram illustrating a method of saving records in a repository to represent the physical relationships between configuration items.

FIG. 4a provides a pictorial representation of configuration items (CIs) for an enterprise data network, and includes a client 412, application 411, IP address 410, network interface 409, server 408, location 407 for a site 406. Site A 406 is a building that includes the location 407, such as a Data Center. In the location are network Hubs 414, 415 which are coupled to network interfaces 416, 417, and 430. Here, the server 408 is connected to Hub 415 through two Network Interfaces 430, 409, and the Network Interface 416 couples to another Network Interface 417 via an IP address 413.

Records matching the configuration of this network asset information Network interface record table 427, network device record table 428, site record table 429, and asset information 432 are saved in the repository 111 by prediction software 109 according to business rules on how the configuration items interrelate 433. For example, business rule relationships that are hierarchical, that is, the second asset exists only as a consequence of the first asset, can be saved in the repository 111 with the designation between the configuration items listed in the record itself via the network interface record 427, network device record 428, and/or application record 441. Records assist in building profiles, and exemplary records include: router asset record 418, location record 419, network interface record 420, equipment lease record 422, network schematic record 423, equipment maintenance record 424, repair history record 425, and/or site record 426.

Figure 4D:
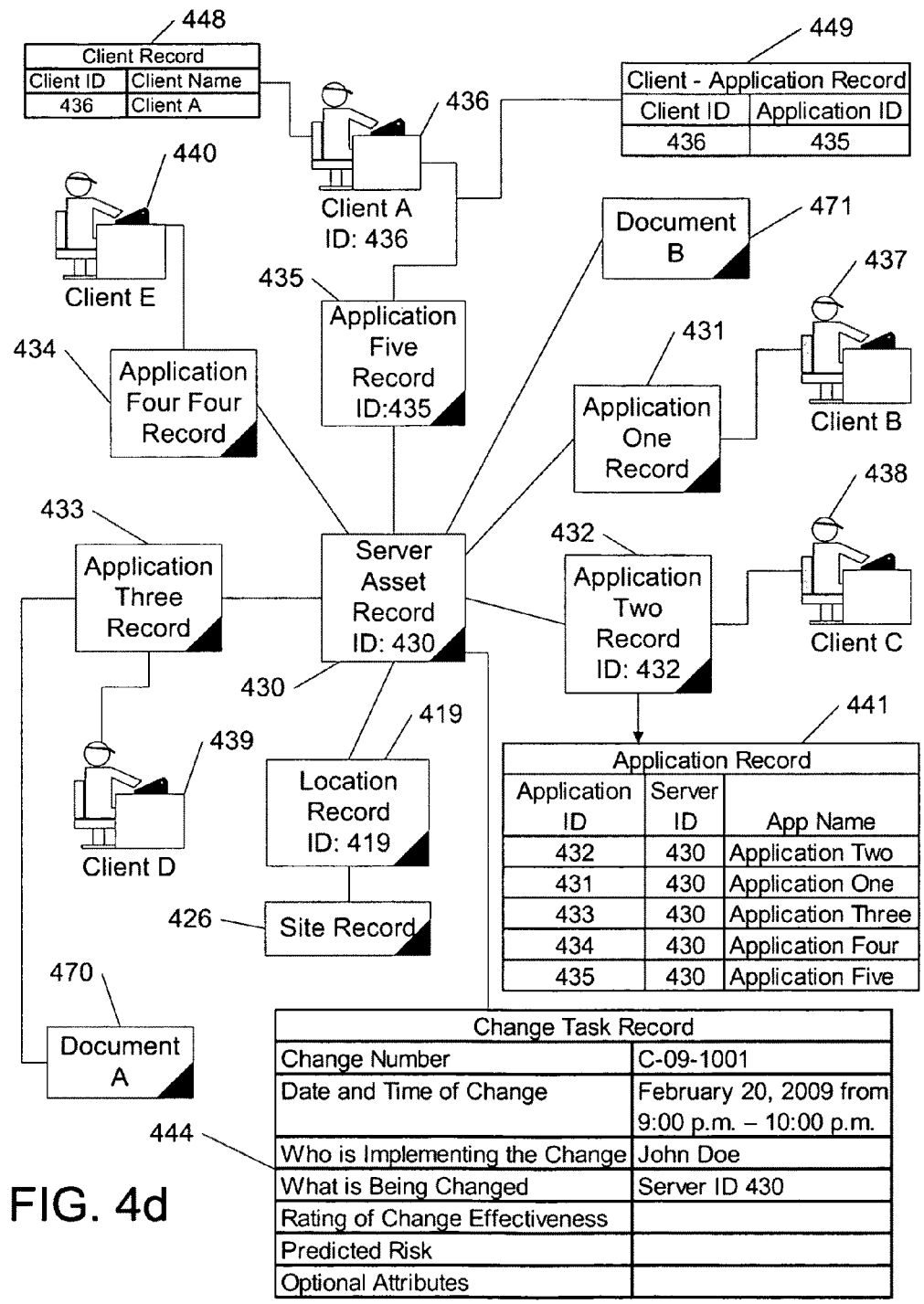
FIG. 4d is a flow diagram illustrating a method for defining applications on servers, clients, clients that use applications, and a change record for servers and its associated interdependencies.

FIG. 4d illustrates how end-user clients 436-440 application 441, client-application 449, change task 444, and client records 448 are created. The records in the client records table 448 describe each client group, such as organizational departments (sales, manufacturing, operations, etc.). Records are also created that describe which applications are used by each client in the client-application table 449. In the described example, Client A 436 uses Application Five 435. Similarly, Client B 437 uses Application One 431, Client C 438 uses Application Two 432, Client D 439 uses Application Three 433, and Client E 440 uses Application Four 434. Relationships on Document A 470, and Document B 471 associated with configuration items are also included. A site record 426 and location record 419 meet the other records in a server asset record 430.

Figure 4E:
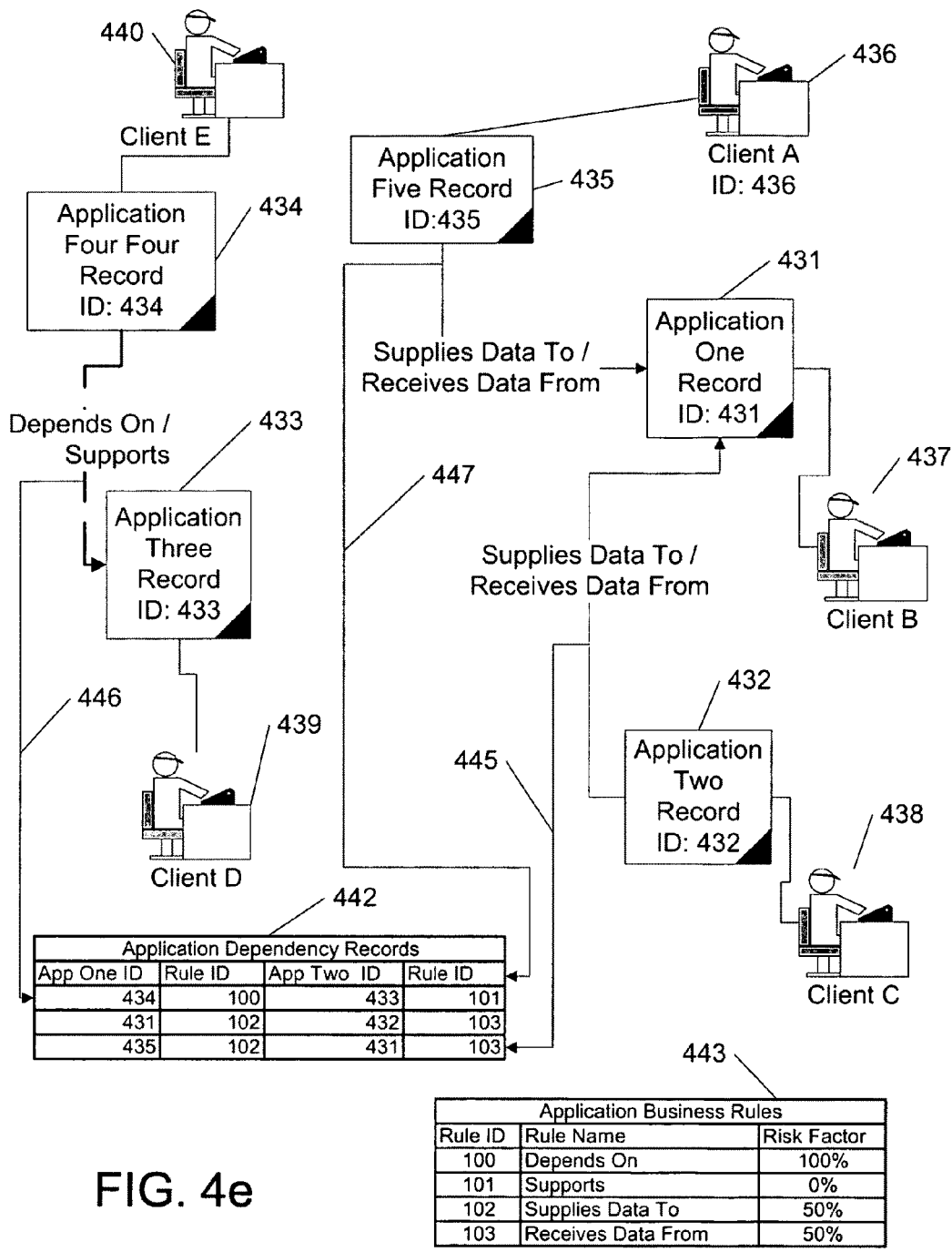
FIG. 4e is a flow diagram illustrating a method for defining application business rules and application dependency records.

FIG. 4e describes relationships between applications. A designation is first created that identifies the various ways applications interrelate. These designations are used to identify the dependency relationship between two applications. In the described example, Application Five 435 supplies data to Application One 431. This relationship 447 is saved in the repository 111 as an Application Dependency Record 442. Relationships between applications 445-447 are saved as Application Dependency Records 442.

A user of the prediction software program 100 can add all of the record links between configuration items of FIGS. 4a, 4c, 4d, 4e, 4f, 4g, application dependency links of FIG. 4e, and client-application links of FIG. 4d, to the repository FIG. 1. Alternately, such links can be created automatically using standard auto-discovery techniques (Simple Network Management Protocol, Windows Management Interface, etc.) or through packet analysis of network traffic (described as "automated dependency mapping," below).

Planned changes are associated to the asset being changed. Consider, for example, a planned change C-09-1001 (444) to Server ID 430. Based on the records in the database, the prediction software 109 can compute and identify that applications 431, 432, 433, 434, 435 on server 430 can be affected by the change. Similarly, a planned change to Server ID 430 (441) can affect Clients A, B, C, D and E 436, 437, 438, 439, 440 which all use applications on Server ID 430.

Figure 4F:
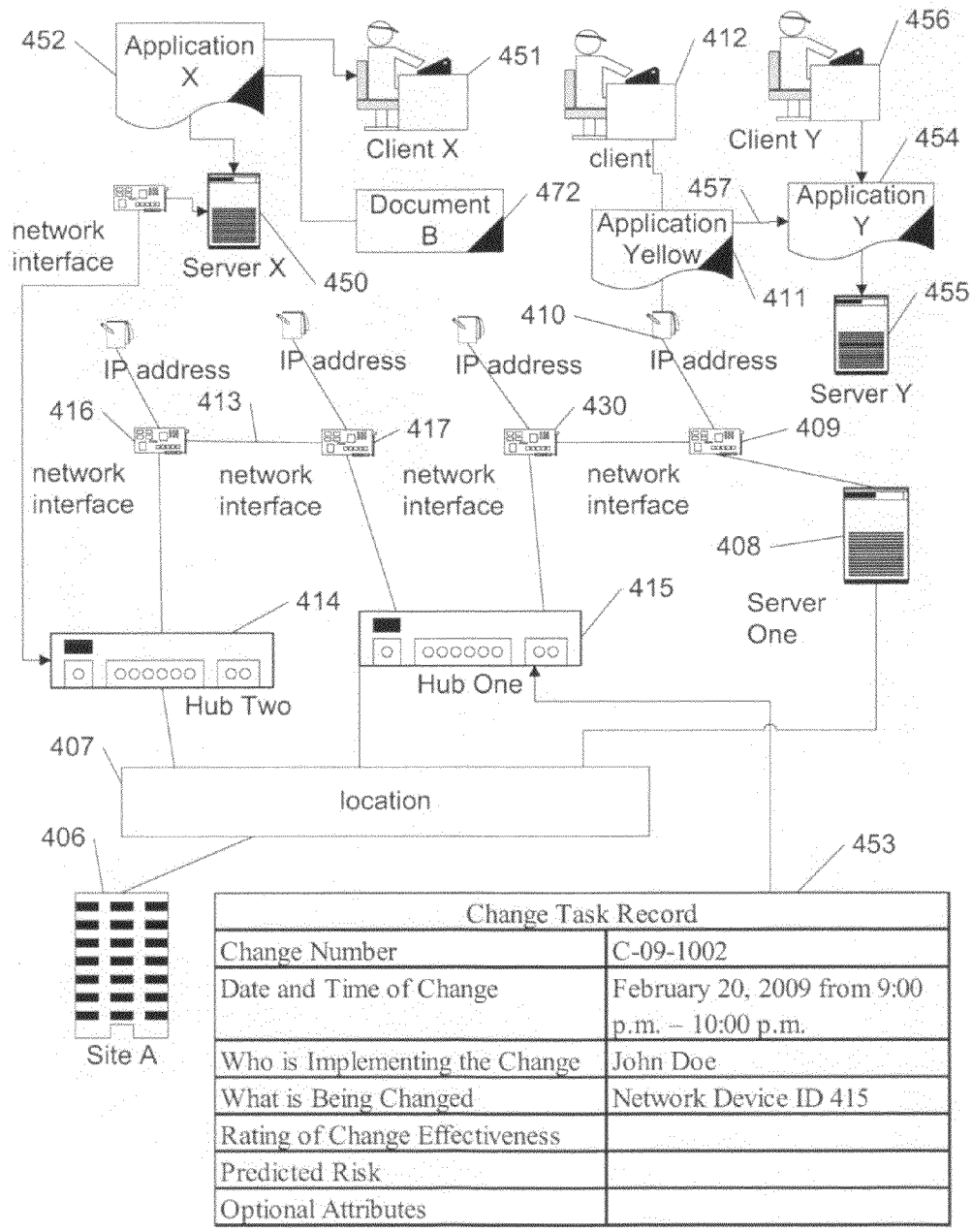
FIG. 4f is a flow diagram illustrating a method for defining a change record to a network hub and its associated interdependencies.

Use of recursive analysis and application dependency rules expands the prediction accuracy. FIG. 4f identifies a planned change 453 to network Hub One 415. The prediction software can identify that such a change can affect Server One 408 which is connected to Hub One 415 through two network interfaces 430, 409. Computing the effect of the change 453 recursively shows that it can also affect Application Yellow 411 on Server One 408 and also Hub Two 414. Further recursive computing identifies that the change 453 can affect Server X 450. This change 453 can also affect Application X 452 (on Server X 450). This change therefore can also affect Client X 451, (who uses Application X 452 or Server X 450). This change therefore may also affect Document G 472, (associated with Application X 452).

Figure 4G:
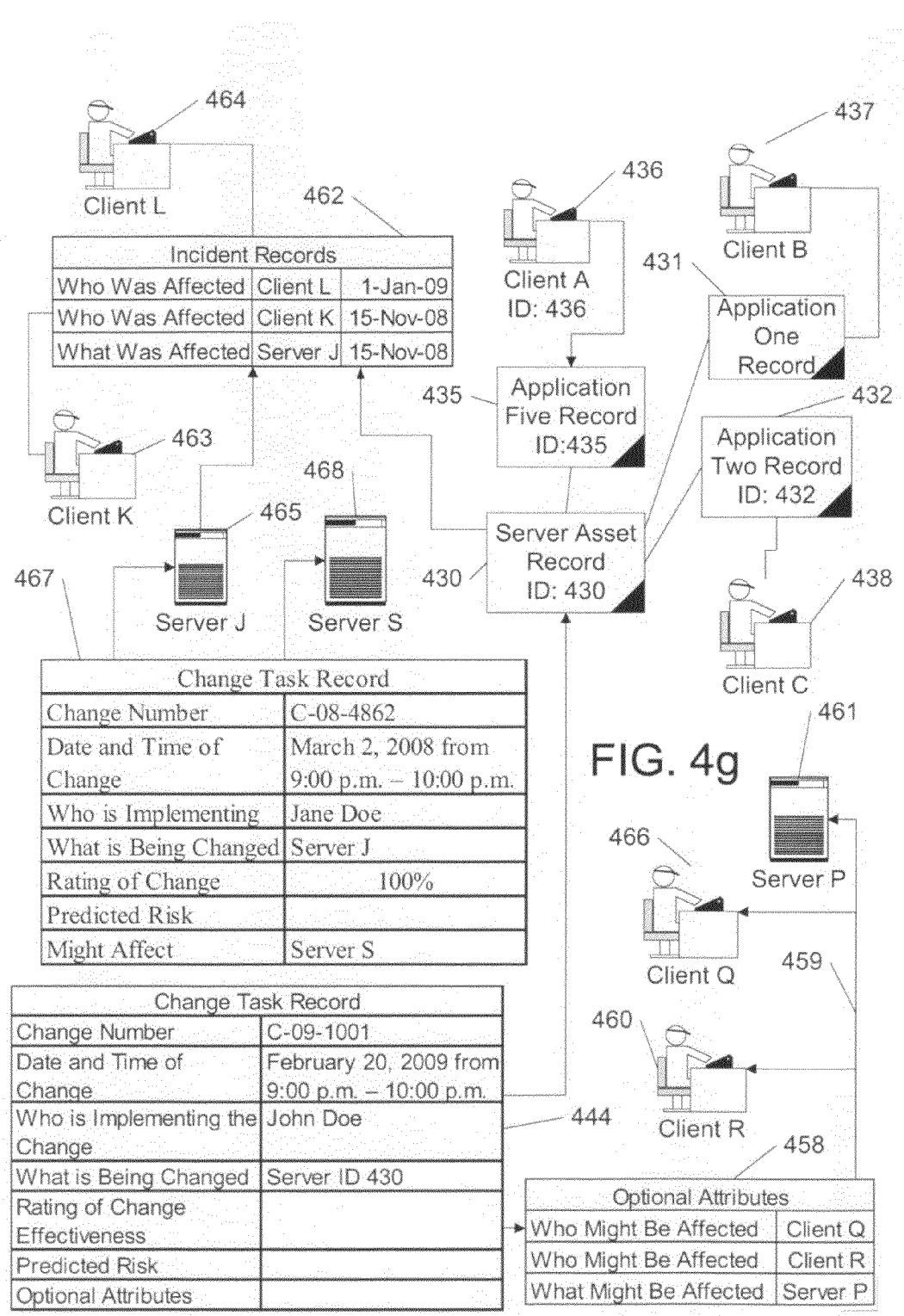
FIG. 4g is a flow diagram illustrating an interdependence between configuration items as learned by social networking methods of past incident records, individual expert knowledge of the environment, and a change record for servers and its associated interdependencies.

Computing the effect of the change 453 using application dependency rules identifies that Application Y 454 can be affected due to its relationship 457 to Application Yellow 411. Such an affect can also affect Client Y 456 because of its use of Application Y 454. The business rule risk factor 443 of the dependency 457 can determine whether the change "will" (i.e. 100%) or "may" (i.e. 50%) affect the dependent application. A relationship that supplies data between applications may or may not affect the subordinate application, depending on the data. The prediction computation can optionally be strengthened by using Social Networking. People who work in the IT environment have additional valuable information that can help predict the effect of future changes. For example, as shown in FIG. 4g, a change record 444 can optionally capture who and what the change implementer believes might be affected by the change. In the example shown, John Doe believes 458 that a change on Feb. 20, 2009 might also affect Client Q 466, Client R 460, and Server P 461.

The prediction computation can further optionally be strengthened by other Social Networking, using past incident records 462. In the example shown, on Jan. 1, 2009, Server 430 was out of service and Client L 464 was affected. On Nov. 15, 2008, Client K 463, and Server J 465 were affected by out-of-service incidents 462 of server 430. As such, a planned change to server 430 can potentially affect Clients L and K because such clients were affected when the server was out of service. The prediction computation can further optionally be strengthened by using past changes of each affected asset 467. In the example shown, past change C-08-4863 (467) completed on Mar. 2, 2008, by Jane Doe identified that Server S could be affected by a change to Server J. As such, a future change to Server 430, potentially affects Server J 465 (known from incident record 462), and can potentially affect Server S 468, known from past change record C-08-4862 (467). The computation to identify 1) who can be affected by the change, and 2) what can be affected by the change can be done: a) recursively to a known level of relationships away from the change, b) until the affected impact is less than a defined risk level, or c) infinitely until no further relationships exist that have not been analyzed through the recursive process.

When the prediction is first performed, it can be computed based on a known level or relationships from the asset being changed. For example, in FIG. 4d, a change is made to server ID 430 (444), which is defined as Level 0. Affected Applications One, Two, Three, Four and Five are one degree away, Level 1. Affected Clients A, B, C, D and E are two degrees away, Level 2.

In FIG. 4f, a change (453) to Hub One can affect Server One, three degrees away, Level 3, through Network Interface 430 and 409. Affected Application, Yellow 411, is six degrees away from the change, Level 6, through network interface 409 and IP address 410. Application Y 454, is seven degrees away and Client Y is eight degrees away, Level 8. A prediction computation of up to Level 8 would identify Client Y as potentially being affected. The application business rule risk factor of FIG. 4e 443 (in table 442) can be applied as each level is progressed. In the examples shown, a change to Application Three 433 will absolutely (100%) affect Application Four 434, which, as defined in the Application Dependency Record of table 442, depends on Application Three. In the computation, Application Four 434 and its associated Client E 440 can be identified as being affected at a 100% risk level from a change to Application Three 433.

However, a change to Application One 431 is defined in table 442 to only supply data to Application Two 432, which has a resulting 50% risk factor per table 443. All downstream affected assets and clients should be assigned a 50% risk factor, as such, Client C 438 has a 50% risk of being affected by a change to Application One 431. As each subsequent level is progressed, risk factor percentages are applied, such that subsequent levels away from the changed asset will result in less and less percentages of risk.

Levels of prediction computation based on Social Network data can be depreciated based on the date of the planned change as compared to the past date of the completed change or past incident. That is, a planned change FIG. 4g 444 for Feb. 20, 2009 can rely on past change records 467 that was completed Mar. 2, 2008. That past change identified that Server S 468 could be affected, but since this information is at least 355 days old, the reliability and confidence of the risk can be depreciated based on some algorithm that decreases the validity of the risk as time increases. For instance of one such algorithm could define that social network data must be less than one year old to be valid. In the example above, a future change for Feb. 20, 2009 is 355 days from the past change on Mar. 2, 2008, and according to the one year algorithm rule, is only 2.7% level of confidence $((1-355/365)\times 100\%)$. All subsequent assets or clients affected in subsequent Levels based on this social network data would be depreciated in their level of confidence based by the confidence rating, in this case 2.7%.

While this description described methods for how to compute the Environmental Variable, one of ordinary skill in the related art can devise other methods to factor the interdependence of a change with its risk of failure. Other methods can include the financial impact of the change, the number of people affected by the change, the time of the month of the change as compared with seasonal business cycles (i.e. a change affecting the financial systems and the end of the month, a change that could affect retail systems and the end of the year), changes that affect VIPs, or critical business partners, for example.

Computing the Organizational Variable

Both socio-technical systems theory and human error theory point-out that organizations have an influence on the risk of failure or the likelihood of success for an IT change. For instance, industry has defined several "best practices" that help influence the likelihood of success. The software can record whether the organization has a change advisory board (CAB) to review and approve changes, whether the organization has defined "change windows" for days/times that changes can be conducted, and whether changes must have a minimum notice period. A user of the prediction software 100 can record the existence of these behaviors in the repository 111 once, updated periodically, or modified as new behaviors are adopted.

Computing Feedback

Since the change record is first entered in advance of the change, the risk of failure of the change can vary as conditions change. For instance, a different day may be selected for the change, which would affect the risk. A different person can be selected to complete the change, changing the risk. The network configuration interrelationships can change, additional changes can be planned on the same day or more changes planned to the same asset, which all can affect the risk. Since the risk changes over time, the prediction software FIG. 1 109 saves the Predicted Risk value in the change record FIG. 4d table 444 every time the record is read or on some automatic, recurring period (i.e. daily). The prediction software is envisioned to send notifications, through e-mail or some other means, how the risk predictions change as the date for the planned IT change nears.

Also, on the date and time of the change, the prediction software 109 performs an automatic computation of the risk value based on the conditions at the time of the change. This predicted risk value would be saved in the change record of table 444.

As described above, at a later date, the success rating is added to the change record 300. Several feedback variables can be computed based on the predicted risk and the ultimate success of the change. One such computer computation could average all of the Likelihood of Success ratings (1−Risk of Failure) of a particular implementer's change records 300 as compared to the average of all the Success Ratings of that same individual. This positive or negative difference can be added or subtracted as feedback to the overall prediction computation for future changes for that implementer, as multiplied by its associated coefficient 201.

Computing the Overall Risk of Failure

Coefficients a, b, c, d and e of equation 200 in the Model of FIG. 2 can be defined by 1) expert assumption, 2) industry research, 3) surveys of IT professionals, 4) experimentation or 5) detailed analysis of each change failure within a particular network environment. As an example, coefficients a, b, c, d, and e can be assumed as shown in the preferred embodiment 201. A mathematical normalization of the various Variables and Feedback metrics is performed to ensure that the resulting risk factor is not less than 0% or more than 100%. For instance, the selection of criteria for the Temporal Variable should result in a number that when added into the model equation, will not allow the resulting risk factor to be less than 0% or more than 100%.

With added experience with the model and based on past predictions, better choices of an effective model and coefficients can be made to improve the prediction computation. The risk of failure and the likelihood of success does not predict the actual outcome of a particular change. The computed risk of failure is only a risk that may or may not be realized. However, the relative risks defined by this invention between various changes or between specific changes with different variables should detail various relative risks and success factors.

Automated Dependency Mapping

FIG. 5 describes a method and system to automate application dependency and usage mappings. As described above, the prediction capability is improved by adding dependency mappings and usage patterns of applications into the prediction software 501 running on Server X 502. These mappings can be added manually by the prediction software user 500, or through automated means.

Packet inspection software and routines 509-511 can be implemented on network devices like switches or routers by hardware manufacturers such as Alcatel-Lucent, Intel, or Cisco. Alternately, packet inspection software and routines 508, 519 can be implemented on network interfaces by hardware or software manufactures like Intel, Interphase Corporation, or Microsoft. Packet inspection software analyzes network data traffic to determine application relationships.

For example, Client Y 503 uses a computer connected to Switch One 512 to access an application Tripwire 504 which is installed on Server Y 505. The Prediction Software 501 can be configured manually to record the existence of Client Y 503 by the prediction software user 500, loaded during the set-up of the prediction software, or automatically through integration with such directory services like Microsoft Active Directory. Information about the relationship 520 that Client Y 503 uses application Tripwire 504 on Server Y 505 is desired. This relationship can be "discovered" by packet inspection software on either Switch One 509 or packet inspection software 508 on the server's network interface 506. This software identifies network requests from the IP address 521 of Client Y's computer that are responded by network traffic from the IP address 507 for the network interface 506 of Server Y 505. Inspection of the packet headers can reveal known TCP/IP port types 522 that identify the type of communication. In the example, communications using TCP/IP port 1169 of table 522 would indicate the application being used is Tripwire 504.

Packet inspection 509, 508, 510, 511, 519 at several locations can identify the inter-application communications 518 between the Tripwire application 504 on Server Y 505 and its SQL database 517 on Server P 515. For example, packet inspection 510 resides on switch two 513, and packet inspection 511 resides on switch three 514. This inspection would identify the source IP address 506 making requests to IP address 516 using TCP/IP port 1433 which identifies a Microsoft SQL database in table 522. Similarly, packet inspection 519 resides on network interface 516 having IP address 522, and is coupled to the SQL Database Tripwire 517 via Server P 515.

All packet inspection applications 509, 508, 510, 511, 519 report the communication pairs to the prediction software 501. This information is organized and stored in a fashion to indicate Application Tripwire 504 is Used By 520 Client Y 503 and SQL Database Tripwire 517 Supports 518 Application Tripwire 504. One of ordinary skill in the art described herein can anticipate and implement this method using several techniques. This automated inspection and mapping can be done with network interface media access control (MAC) addresses, with TCP/IP addresses, or with combinations of both.

Avoiding Downtime

Lastly, IT professionals use the prediction software to avoid potential problems, before they happen. If planned changes are computed to have an unacceptable high risk, the planned IT change should be improved. This can include undertaking the change on a different day, by a different person, or by cancelling other competing changes that occur around the same time.

Clients identified by this invention that could be affected by the change can be warned, so they are not surprised by the change. After the change is completed, all of the applications identified by this invention that could be affected by the change can be tested. Documents associated with changed affected assets are identified as potentially needing updates. Without this invention, such documents may be unknown or overlooked, and more easily left out-dated.

Instead of just warning known people who might be affected by the change, with this invention, the change implementer can now warn previously unknown people who can be affected by the change. Instead after the change of just testing applications which were known to be affected by the change, with this invention, the change implementer can now test applications which can be affected by the change that were previously unknown. With the use of the risk and impact prediction of this invention, unexpected or unintended consequences of IT change can and now are avoided.

Of course, it should be understood that the order of the acts of the algorithms discussed herein may be accomplished in different order depending on the preferences of those skilled in the art, and such acts may be accomplished as software. Furthermore, though the invention has been described with respect to a specific preferred embodiment, many variations and modifications will become apparent to those skilled in the art upon reading the present application. It is therefore the intention that the appended claims and their equivalents be interpreted as broadly as possible in view of the prior art to include all such variations and modifications.

I claim:

1. A method stored in memory for storing data for computing a risk of failure or likelihood of success of an information technology (IT) change in an organization, comprising:
    determining a Base Variable value;
    estimating a Temporal Variable value for a proposed change;
    computing an Environmental Variable value reflecting an interdependence of an asset to be changed;
    estimating an Organizational Variable value;
    determining a Feedback Variable value; and
    computing the sum of the Variable values.

2. The method of claim 1 wherein each variable value is multiplied by independent coefficients, the sum of the coefficients being one (1).

3. The method of claim 1 wherein each of the Variable values are estimated based on either expert assumption, industry research, surveys, or experimentation.

4. The method of claim 1 wherein the Base Variable is based in part on at least one change task record.

5. The method of claim 4 wherein the change task record includes: 1) a descriptor of a person making a system change, 2) a rating of how this change was completed, 3) a descriptor of an asset being changed, 4) a field that saves a computed prediction value, and 5) an ID number for the at least one change record.

6. The method of claim 1 wherein the Temporal Variable is based in part on past change records maintained in a repository.

7. The method of claim 1 wherein the Environmental Variable is based in part on social network data.

8. The method of claim 1 wherein the Organizational Variable is based in part on organizational behavior including a defined change window.

9. The method of claim 1 wherein the Feedback Variable is based in part on a prior predicted risk value.

10. The method of claim 1 further comprising deploying IT resources based on a desired risk level.

11. The method of claim 1 further comprising making a change to the IT system in order to reduce the risk level.

12. The method of claim 1 further comprising notifying a client or other person in order to reduce the risk level.

13. The method of claim 1 wherein at least one of the coefficients is a negative number.

14. The method of claim 1 wherein the Environmental Variable value is computed based on 1) the number of subordinate systems that can be affected by the change, 2) the number of people or clients that can be affected by the change, 3) a cost impact that could be affected by the change, or 4) combinations of these or other factors.

15. The method of claim 1 wherein the Temporal Variable value relates to 1) a task situation, 2) behavior of a person for a task, or 3) combinations of these or other factors.

16. A method implemented as software modules, comprising:
   determining a Base Variable value;
      estimating a Temporal Variable value for a proposed change;
      computing an Environmental Variable value reflecting the interdependence of the asset to be changed;
      estimating an Organizational Variable value;
      determining a Feedback Variable value; and
      computing the sum of each of the Variable values.

* * * * *